United States Patent
El-Sherif

(10) Patent No.: US 7,228,012 B2
(45) Date of Patent: Jun. 5, 2007

(54) ON-FIBER MICROWAVE MODULATOR AND HIGH SPEED SWITCH FOR TELECOMMUNICATION APPLICATIONS

(75) Inventor: Mahmoud A. El-Sherif, Penn Valley, PA (US)

(73) Assignee: Photonics On-Fiber Devices, Inc., Philadelphia, PA (US)

( * ) Notice: Subject to any disclaimer, the term of this patent is extended or adjusted under 35 U.S.C. 154(b) by 0 days.

(21) Appl. No.: 11/195,210

(22) Filed: Aug. 1, 2005

(65) Prior Publication Data

US 2007/0025656 A1 Feb. 1, 2007

(51) Int. Cl.
*G02F 1/035* (2006.01)
*G02B 6/42* (2006.01)

(52) U.S. Cl. ............................................ 385/2; 385/40
(58) Field of Classification Search ...................... None
See application file for complete search history.

(56) References Cited

U.S. PATENT DOCUMENTS 5,317,667 A * 5/1994 Weber et al. ............... 385/147
5,506,721 A * 4/1996 Hikami et al. .............. 359/285
6,421,483 B1 * 7/2002 Hajjar ........................... 385/48

\* cited by examiner

*Primary Examiner*—Michelle Connelly-Cushwa
*Assistant Examiner*—Jerry T Rahll
(74) *Attorney, Agent, or Firm*—John S. Munday

(57) ABSTRACT

Application of a communication signal, RF (radio frequency) or microwave signal to a modified optical fiber for modulating or switching-off the optical signal propagating within the optical fiber. The passive cladding material of an ordinary optical fiber is removed from a small region and replaced with active multilayer materials including at least three layers of cladding surrounding the core. These layers are the inner metallic electrode coated on the surface of the optical fiber core, the electrooptic active material layer placed on the top of the inner electrode, and the outer metallic electrode coated on the top of the electrooptic material. A communication signal applied to the electrodes will result in optical modulation so that the modulated intensity and phase of the optical signal at the receiving end of the fiber can be detected, and demodulation of the signal can be achieved.

11 Claims, 4 Drawing Sheets

ON-FIBER MICROWAVE MODULATOR AND HIGH SPEED SWITCH FOR TELECOMMUNICATION APPLICATIONS

FIELD OF THE INVENTION

This invention relates to an on-fiber microwave optical modulator including a modified optical fiber and fiber optic modulators and switches. The invented fiber optic components are constructed onto the fiber core of ordinary optical fibers.

BACKGROUND OF THE INVENTION

Because of the importance of integrated optics in the telecommunication industry, a great deal of effort has been expended to reduce insertion loss associated with coupling a light between integrated optical components, such as modulators and switches, and fiber links, to the lowest possible level and with reasonable expenses. Such components are generally known as multiplexers, modulators, couplers, switches and sensors. There is a particular need for improved optical modulation in some or all of these components and in the systems using them. This invention is an improvement on U.S. Pat. No. 5,060,307.

I have invented such components, which use a modified ordinary optical fiber. Wherein the fiber has a small area from which the cladding material has been removed and replaced with an active multilayer of materials structure, i.e. the modified cladding, which is sensitive to electromagnetic fields and should satisfy the conditions: in the presence of an external electromagnetic field, the optical properties of the active multilayer materials should change as well as the transmission characteristics of optical signals propagating within the modified region. The modified cladding is constructed of at least three layers; an inner metallic electrode coated directly on the core of the optical fiber, a layer of electrooptic material coated on the top of the first electrode, and a layer of a second electrode (outer electrode) covering the electrooptic material. Additional coating layers may be used between each two layers of the basic three layer structure to improve the interface properties. My device can be used as a modulator or switch. Also it can be used as an electromagnetic field sensor for determination of the applied external signal.

One important advantage of this invention is that it provides an optical modulation of the signal propagating within an optical fiber, which employs optical intensity, phase and/or polarization modulation by the continuous changing of the optical properties of the multilayer modified cladding resulting from external communication signals applied to the fiber modified region, e.g. RF or microwave signals, and can be used for the long distance transmission of these communication signals.

In addition, the device can be used as a high speed switch for switching off optical signals propagating in a communication link. The switching on-off is controlled by a high speed electric signal applied to the modified region of the fiber.

Other advantages will appear hereinafter.

SUMMARY OF THE INVENTION

It has now been discovered that the above and other advantages of the present invention may be achieved in the following manner. This invention is directed to the combination of an external communication signal applied to a single optical fiber having a region where the cladding material has been removed and replaced with an active multilayer material system to produce a modified region of the optical fiber.

This invention is also directed to an apparatus for modulating and switching an optical signal propagating in an optical fiber consisting of a core surrounded by multiple cladding layers. The apparatus includes an optical fiber having the passive cladding material removed from a portion of the optical fiber to produce an uncladded section of the fiber. On this uncladded section is placed an active multilayer materials structure to produce a coated core section of the fiber The properties of the materials system can be changed by applying an external electromagnetic field. The multilayer materials system constructed of at least three layers. A thin metallic layer (inner or first electrode) is coated on the surface of the fiber core. A thin layer of electrooptic material is coated on the top of the inner electrode. Finally, a second or outer metallic electrode layer coated on the top of the electrooptic materials. Of course, additional layers can be added between the basic three layers to improve the interface properties of the materials system.

The system of this invention also includes means for transmitting an optical signal through an optical fiber and the modified region, said optical carrier signal and an external signal means applied to the modified section of the optical fiber to modulate or switch off the light signal transmitted through the fiber, said modulating communication signal. Also included is a means for detecting and reading out the light signal transmitted in the modified optical fiber, said means for detection of the optical signal phase and intensity information and demodulation for communication signal separation and restoration.

This invention is also directed to a method for modulating and switching-off a light signal being transmitted through an optical fiber in a modified region, which is consisting of a transparent core surrounded by an active multilayer structure comprising applying an external communication signal to the modified section of the optical fiber which has had the cladding material removed and said section constructed of a multilayer materials system comprising two metallic electrodes and an electrooptic active material, such as, liquid crystal or electro-optic polymer or solid state material.

Finally, this invention is directed to a device which uses an applied signal, a signal such as an electrical, magnetic, electromagnetic or microwave applied to the region of modified fiber and to a device using solutions having large electro-optic and/or magneto-optic effect as the active medium.

BRIEF DESCRIPTION OF THE DRAWINGS

The invention described herein is shown by reference to the drawings, although it is to be understood that the drawings are referred to only for purposes of illustration and example, and the scope of the invention is not limited thereto. For a more complete understanding of the invention, reference is hereby made to the drawings, in which.

DETAILED DESCRIPTION OF THE PREFERRED EMBODIMENT

Figure 1:
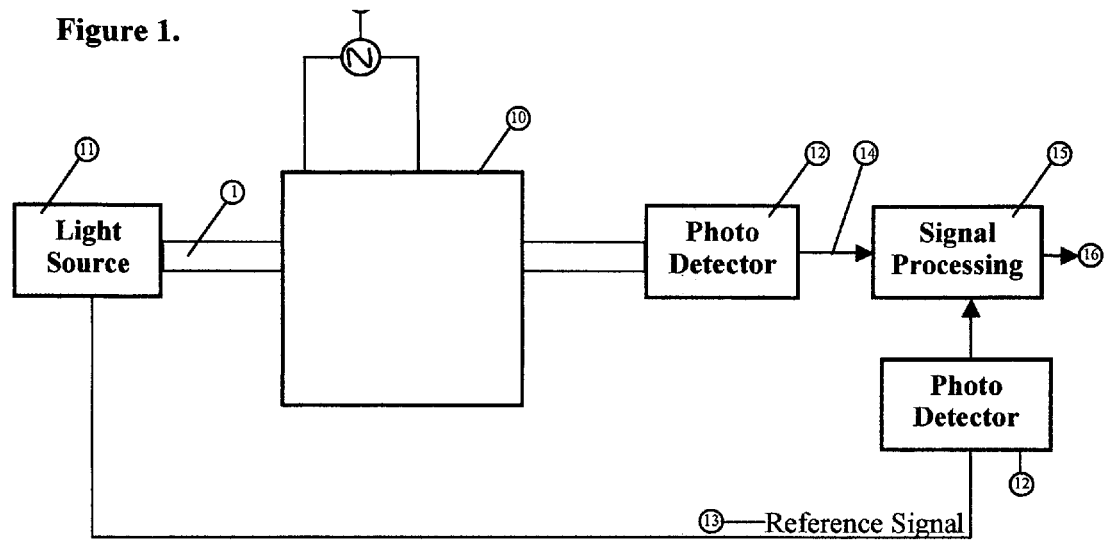
FIG. 1 shows a schematic view of an optical fiber device based on intensity modulation comprising: light source, an optical modulator and switch, photo-detectors, signal processing, and a reference signal.

FIG. 1 shows an optical fiber 1 with a portion of the cladding material removed and replaced with a multilayer modified cladding. A light signal from the light source 11 transmitted in the optical fiber is modulated by an external communication signal 9 applied to the optical modulator and switch 10 and the modulated optical signal detected by photodetector 12, wherein the detector output signal 14 is processed by means of a signal processing means 15. At the same time a reference signal 13 from the light source 11 is detected by another photo-detector 12 and the output is sent to the signal processing 15 for comparison with the modulated signal for noise elimination. Device 10 is an optical fiber modulator or switch.

In FIG. 1, the continuous changing of the applied external electromagnetic field results in continuous changing of the optical properties of the modified fiber which provides optical intensity modulation of the propagating optical signal. Also, the continuous changing of the applied external electromagnetic field results in continuous changing of the refractive index of the modified cladding which provides phase modulation of the propagating optical signal.

The moved components of this invention, shown in FIG. 1, can be used as a switch. Switching-off the optical signal in the optical fiber occurs when the applied signal changes the optical properties of the modified region to certain values which result in full dissipation of the optical signal. Also, switching-off the optical signal in the optical fiber occurs when the applied signal changes the phase of the propagating signal by a half wavelength or 180° with respect to the original reference signal.

Figure 2:
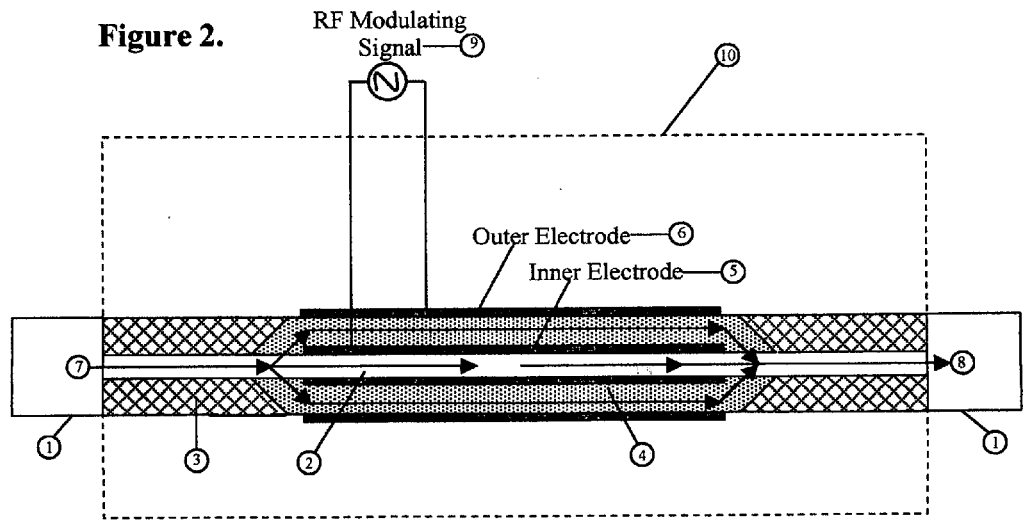
FIG. 2 shows a schematic view of an RF optical modulator and/or switch.

FIG. 2 is the optical modulator and switch of this invention, wherein optical fiber 1 has had a portion of the fiber cladding 3 removed and replaced with a multilayer active cladding. The multilayer cladding comprises at least three layers, inner electrode 5, electrooptic material 4, and outer electrode 6. An optical signal is transmitted into the optical fiber through the optical signal input 7. The signal is modulated by an external RF (Radio Frequency) modulating signal 9 applied by means of an inner electrode 5 and an outer electrode 6. The inner and outer electrodes are made of conductive material and they are placed within the modified region. The inner and outer electrodes are used to modulate the properties of the electrooptic material in the modified region. Therefore, the optical signal is modulated in the modified region. FIG. 2 shows the path of the optical signal through the fiber core (single mode or multimode) 2 and through the modified region. The optical signal propagating in the fiber core 2 is partially or totally coupled to the modified cladding, where the material properties are modulated by the RF signal. At the end of the modified region, the modulated optical signal is coupled back to the fiber core 2. The modulated optical signal then exits the fiber through the modulated signal output 8.

Figure 3:
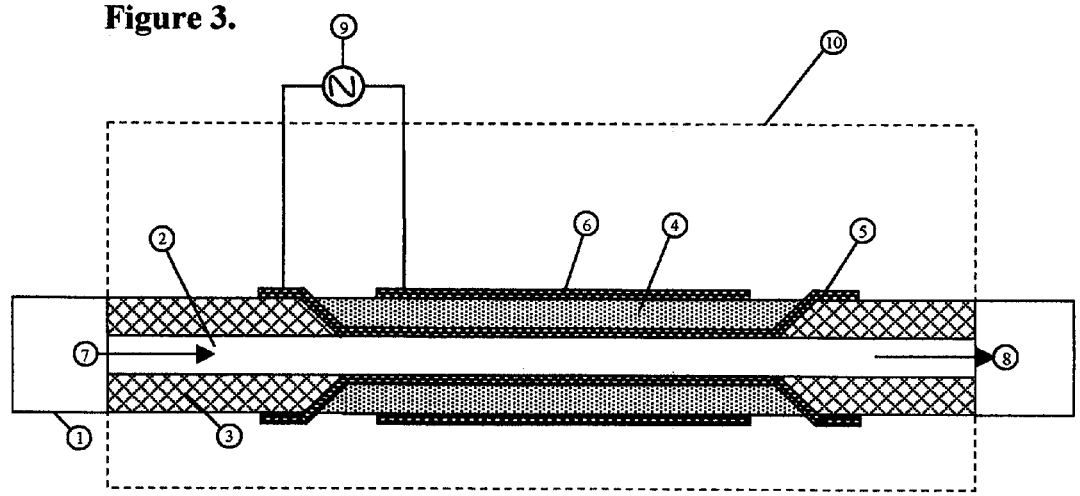
FIG. 3 shows a schematic view of an alternate embodiment of an RF optical modulator and switch.

FIG. 3 is an alternate configuration of FIG. 2. It shows the schematic of an RF optical modulator and switch. FIG. 3 consists of an optical fiber 1 that has had a portion of the fiber cladding 3 removed and replaced with an active multilayer material structure comprising: inner 5 and outer 6 electrodes with a layer of electrooptic material 4 in between. An optical signal is transmitted into the optical fiber through the optical signal input 7. The signal is modulated by an external RF (Radio Frequency) modulating signal 9 applied by means of an inner electrode 5 and an outer electrode 6. The inner and outer electrodes are of different lengths. The outer electrode 6 is placed in the modified cladding region. In FIG. 3, the inner electrode 5 is longer in length than the inner electrode in FIG. 2. The inner electrode 5 extends from the modified cladding to cover partially the cladded region of the fiber. The inner and outer electrodes are used to modulate the properties of the electrooptic material in the modified region. Intensity and/or phase modulation of the optical signal is achieved. The optical signal propagating in the fiber core 2 is totally or partially coupled to the modified cladding where the material properties are modulated by the RF signal. The modulated optical signal exits the fiber through the modulated signal output 8.

Figure 4:
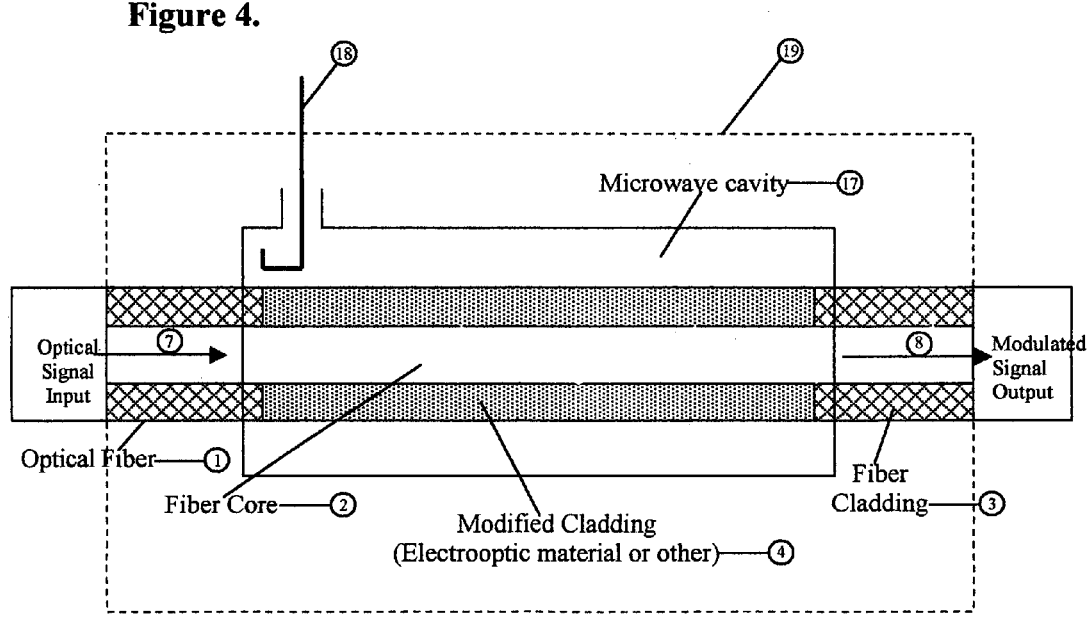
FIG. 4 shows a schematic view of a microwave optical modulator and switch.

FIG. 4 is another alternate configuration of FIGS. 2 and 3 where the electrodes are replaced by a microwave cavity. FIG. 4 is a microwave optical modulator and switch. It consists of an optical fiber 1 that has had a portion of the fiber cladding 3 removed and replaced with modified cladding (electrooptic material or other) 4. An optical signal is transmitted into the optical fiber through the optical signal input 7. The signal is modulated by an external microwave cavity 17 that has a microwave coupler input 18. The microwave cavity 17 in FIG. 4 replaces electrodes 5 and 6 in FIGS. 2 and 3. The microwave cavity 17 is used to modulate the properties of the electrooptic material in the modified region. The microwave signal applied to the microwave cavity is the modulating signal. The fiber core 2 is coated in the modified region with electrooptic material. FIG. 4 shows the path of the optical signal input 7 through the fiber core (single mode or multimode) 2. The modulated optical signal exits the fiber through the modulated signal output 8.

Figure 5:
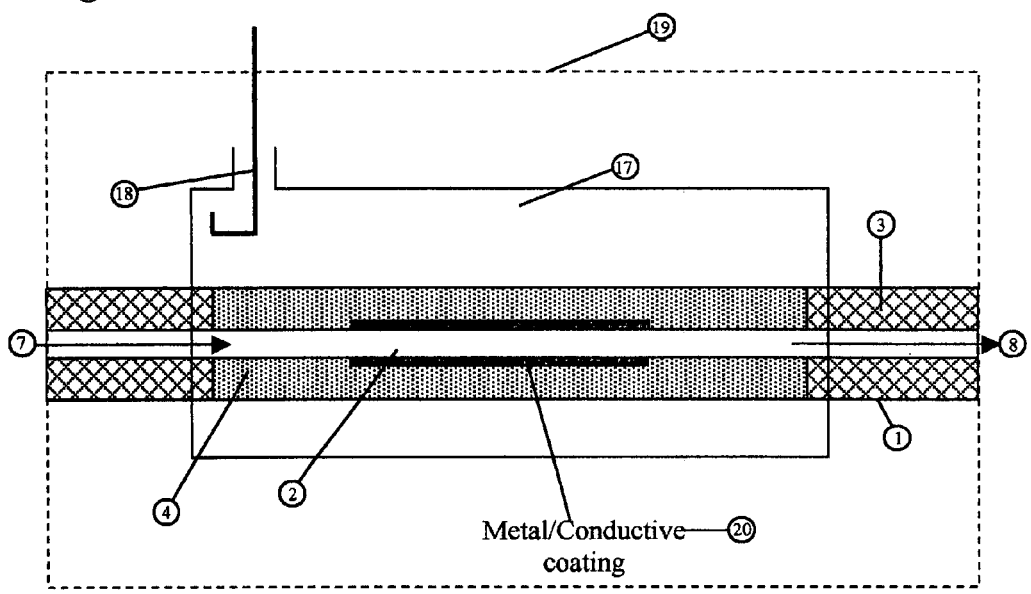
FIG. 5 shows a schematic view of an alternate embodiment of a microwave modulator.

FIG. 5 is yet another alternate configuration of FIG. 4. It is for a modified optical fiber for microwave modulation. FIG. 5 shows the embodiment within an optical fiber 1 that has had a portion of the fiber cladding 3 removed and replaced with modified cladding (electrooptic material or other) 4. An optical signal is transmitted into the optical fiber through the optical signal input 7. The signal is modulated by an external microwave cavity 17 that has a microwave coupler input 18. The configuration of FIG. 5 differs from that of FIG. 4 in that FIG. 5 embodiment has a conductive (metal or other) coating 20 placed in the modified cladding region next to the fiber core. The optical signal propagating in the fiber core 2 is totally or partially coupled to the modified cladding 4 where the material properties are modulated by the microwave signal. The microwave signal applied to the microwave cavity 17 is the modulating signal. At the end of the modified region, the modulated optical signal exits the fiber through the modulated signal output 8.

Figure 6:
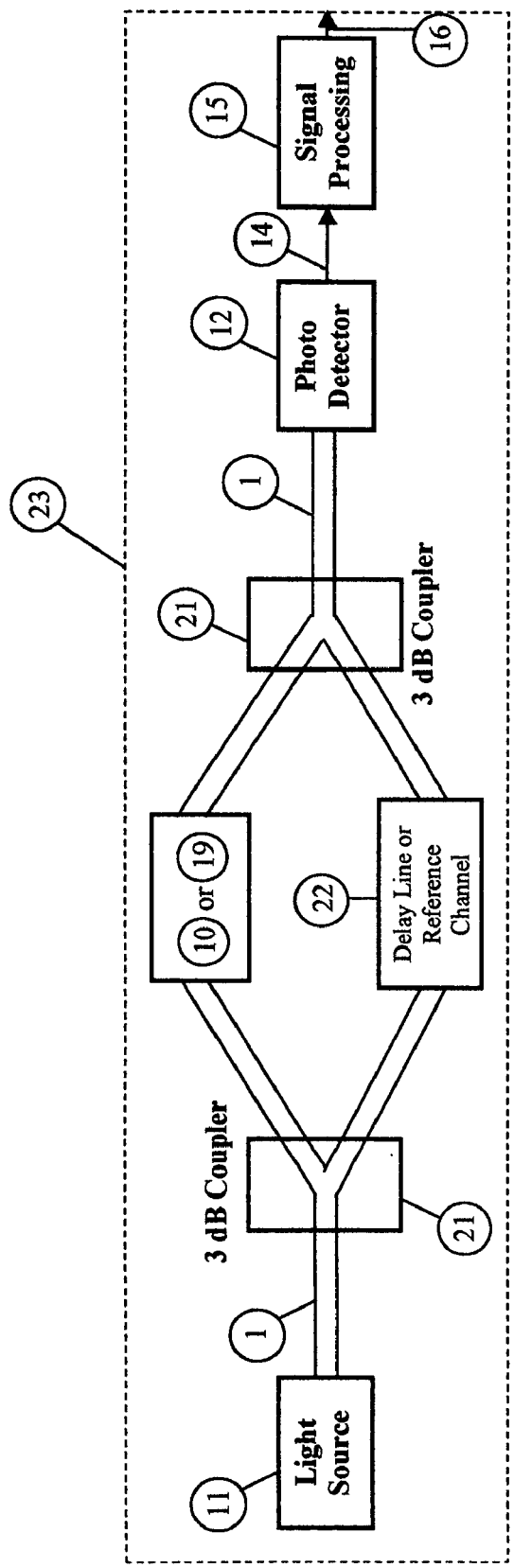
FIG. 6 shows a schematic view of an optical fiber device based on phase modulation comprising: a light source, an optical modulator and interferometric demodulation components.

FIG. 6 is an alternate embodiment of FIG. 1. FIG. 1 is designed for intensity modulation type devices, however, FIG. 6 is designed for phase modulation type devices. Demodulation of the optical signal is achieved by using the interferometric set-up shown in FIG. 6. FIG. 6 shows a light source 11 connected to an optical fiber 1. The fiber is connected to a 3 dB coupler 21. The coupler output is divided to 50%—50% output lines, one connected to the invented device 10 or 19, and the other is connected to the reference channel or delay line 22. The outputs of these two branches are coupled in another 3 dB coupler 21, and the output is connected to a photo-detector 12. The electronic signal 14 of the detector output is connected to a signal processing 15 device. The signal processing output 16 is the electronic high speed communication signal. FIG. 6 is an illustration for the demodulation of the optical signals. However, other demodulation techniques can be used.

While particular embodiments of the present invention have been illustrated and described, it is not intended to limit the invention to any specific embodiment except as defined by the following claims.

The invention claimed is:

1. An apparatus selectively operable as an on-fiber microwave modulator and high speed switch for modulating and switching off an optical signal transmitted in an optical fiber, comprising:

an optical fiber having a core surrounded by a cladding material, and having a region wherein the passive cladding material has been removed to form an exposed core surface;

a modified fiber including at least three layers surrounding the fiber core comprising an inner metallic electrode coated on said exposed surface of the fiber core, an electrooptic active material coated on the top of said inner electrode, and an outer metallic electrode coated on the top of the electrooptic material;

the electrooptic material surrounding the inner electrode having an adjustable index of refraction which is changed by an external electromagnetic field applied to the inner and outer electrodes;

a light source for providing an optical signal carrier for communication signals transmission into said optical fiber and providing a reference signal;

means for applying an external electronic modulating communication signal to the electrooptic material through said inner and outer electrodes to change the optical properties of the modified region to modulate the optical signal in said optical fiber core;

first detector means positioned on said optical fiber downstream from said light source and said region of modified fiber for detecting optical signals in said optical fiber and transfer optical signals to electrical signals; and signal processing means for amplifying an output signal of said detector while also providing demodulation of the electric signal to separate the transmitted communication signal, wherein said reference signal from said light source is used to provide a noise free signal output, said signal output is the electronic communication signal.

2. The apparatus of claim 1, which further includes additional coating layers between each two layers, said additional coating layers providing interface ease and structural integrity.

3. The apparatus of claim 1 wherein the light transmitted signal selected from infrared, visible or near ultra-violet light.

4. The apparatus of claim 1 wherein the external electronic modulating communication signal is an external signal comprising electric, magnetic, or microwave signal applied across the modified region of the optical fiber whereby there is obtained a continuous change of the optical properties of the multilayer materials.

5. The apparatus of claim 1, wherein said external electronic modulating communication signal is selected from digital and analogue signals and applied to the modified region of an optical fiber to provide an oscillating electromagnetic field to said modified region to modulate optical signal in said optical fiber, and whereby the apparatus is operable as an electrooptic modulator for communication systems.

6. The apparatus of claim 1, wherein said means for supplying an electromagnetic field is adapted to modulate the index of refraction of said electrooptic material to induce intensity modulation in the optical signal transmitted through said fiber by means of optical radiation and/or absorption in said modified region, wherein demodulation of the fiber output, said for the extraction of the electronic communication signal, is achieved by an ordinary photodetection set-up.

7. The apparatus of claim 1, wherein said means for supplying an electromagnetic field is adapted to modulate the index of refraction of said electrooptic material to induce phase modulation in the optical signal transmitted through said fiber by means of changing the optical path length in said modified region, wherein demodulation of the fiber output, said for the extraction of the electronic communication signal, is achieved by an interferometric set-up.

8. The apparatus of claim 1, wherein said means for supplying a direct electronic signal is adapted to apply a continuous and direct electromagnetic field to the on-fiber apparatus to switch-off an optical signal in said fiber by changing the optical properties of said fiber in the modified region to achieve zero output, said signal being completely radiated and/or absorbed in said active medium to thereby stop transmission of said signal through said fiber core.

9. The apparatus of claim 1, wherein said means for supplying a direct electronic signal applied to said apparatus changes the optical path length of said modified region by n times the half wavelength where n is an odd number of at least 1, said change in the optical path length result in switching off the signal at the output of the interferometric set-up.

10. The apparatus of claim 1, wherein said optical fiber is selected from the group consisting of single mode or multimode fiber of glass, plastic, multimaterial and nylon material.

11. The apparatus of claim 1 wherein the electrooptic material is sensitive to electromagnetic fields and can be selected from the group consisting of electrooptic polymers, semiconductors, liquid crystal, liquid solution or fused solid.

* * * * *